US012764691B2

(12) United States Patent
Paczkowski et al.

(10) Patent No.: US 12,764,691 B2
(45) Date of Patent: Oct. 13, 2026

(54) USER EQUIPMENT CLUSTERS FOR NETWORK REGISTRATION AND AUTHENTICATION

(71) Applicant: T-MOBILE INNOVATIONS LLC, Overland Park, KS (US)

(72) Inventors: Lyle Walter Paczkowski, Mission Hills, KS (US); Marouane Balmakhtar, Fairfax, VA (US); Galip Murat Karabulut, Vienna, VA (US)

(73) Assignee: T-Mobile Innovations LLC, Overland Park, KS (US)

( * ) Notice: Subject to any disclaimer, the term of this patent is extended or adjusted under 35 U.S.C. 154(b) by 437 days.

(21) Appl. No.: 18/147,383

(22) Filed: Dec. 28, 2022

(65) Prior Publication Data

US 2024/0224214 A1 Jul. 4, 2024

(51) Int. Cl.
*H04W 60/04* (2009.01)
*H04W 76/12* (2018.01)

(52) U.S. Cl.
CPC ........... *H04W 60/04* (2013.01); *H04W 76/12* (2018.02)

(58) Field of Classification Search
None
See application file for complete search history.

(56) References Cited

U.S. PATENT DOCUMENTS 10,117,073 B1 * 10/2018 Dannamaneni ....... H04W 4/023
10,750,567 B2 * 8/2020 Cao .......................... H04B 7/14
10,834,266 B2 * 11/2020 Livanos .............. H04L 12/1407
11,316,700 B1 * 4/2022 Michaelis ........... H04L 63/0428
2013/0016677 A1 * 1/2013 Kunz .................... H04W 76/12 370/328
2013/0203412 A1 * 8/2013 Starsinic ................. H04W 4/70 455/435.1
2017/0251398 A1 * 8/2017 Xu ........................ H04W 28/10
2017/0339656 A1 * 11/2017 Starsinic ................. H04W 4/70
2019/0215302 A1 * 7/2019 Chandramouli ........ H04L 12/66
2021/0345072 A1 * 11/2021 Selvanesan ............. H04W 4/02
2021/0399770 A1 12/2021 Xu et al.
(Continued)

FOREIGN PATENT DOCUMENTS

WO 2021/071402 A1 4/2021
WO 2022/119701 A1 6/2022
WO 2022/159725 A1 7/2022

OTHER PUBLICATIONS

European search report received for European Application No. 23219584.2, mailed on Apr. 16, 2024, 8 pages.

*Primary Examiner* — Khaled M Kassim
*Assistant Examiner* — Shima Wasel
(74) *Attorney, Agent, or Firm* — Shook, Hardy & Bacon L.L.P.

(57) ABSTRACT

Systems and methods for user equipment clusters for network registration and authentication are provided. In some embodiments, a UE aggregation gateway may define one or more UE clusters from a set of UE devices that have connected to an access network. In some embodiments, the UE aggregation gateway may register a UE logical entity with the network and associate a cluster of UE devices with that UE logical entity. The UE aggregation gateway may then function as a proxy gateway for members of the UE cluster, acting on behalf of the members of the UE cluster at least with regard to operations with functions of the operator network core.

17 Claims, 6 Drawing Sheets

(56) References Cited

U.S. PATENT DOCUMENTS

| | | | | |
|---|---|---|---|---|
| 2022/0150740 | A1* | 5/2022 | Yao | H04W 76/12 |
| 2022/0210698 | A1* | 6/2022 | Ly | H04L 67/34 |
| 2022/0279397 | A1* | 9/2022 | Schmidt | H04W 36/00698 |
| 2022/0311871 | A1* | 9/2022 | Manithara Vamanan | H04M 15/66 |
| 2023/0103917 | A1* | 4/2023 | Ericson | H04W 60/00<br>455/435.1 |
| 2023/0362624 | A1* | 11/2023 | Manithara Vamanan | H04W 76/10 |
| 2024/0064793 | A1* | 2/2024 | Ashour | H04W 72/542 |
| 2024/0331544 | A1* | 10/2024 | Kim | G08G 1/162 |

* cited by examiner

USER EQUIPMENT CLUSTERS FOR NETWORK REGISTRATION AND AUTHENTICATION

BACKGROUND

Modern telecommunications networks, such as 3rd Generation Partnership Project (3GPP) 5G (5th generation) telecommunication networks, are primarily designed to transport data to provide network services to user equipment (UE) using wireless connections over licensed radio frequency channels. Today, each 3GPP UE that is granted access to a 5G network over a licensed radio frequency channel first establishes a connection with a radio access network (such as a cellular base station, for example) and through that connection registers with the 5G network as a distinct device representing an individual network connection point. With the advent of 5G network deployment for use by consumer and enterprise users, there is a growing interest in utilizing the high data speeds and bandwidth available from 5G networks—using non-3GPP devices that communicate other than via licensed radio frequency channels—to obtain access to data and content, and/or to perform other operations and transactions with servers accessible through the 5G network. For example, many homes and business now utilize "smart devices" (also referred to as Internet-of-things (IOT) devices or smart appliances). Smart devices typically are designed to perform a well-defined task or set of tasks, in part using a network connection to communicate with a back-end network server. Smart devices that access the 5G network other than via 3GPP licensed radio frequency channels are generally referred to as non-3GPP UE. Such non-3GPP UE typically obtain access to a 5G network through a non-3GPP access network (via either a wired or wireless connection). In order to facilitate the ability of non-3GPP UE devices to access services of the 5G network, the network may include a non-3GPP Interworking Function (N3IWF). The N3IWF essentially functions as a gateway between the non-3GPP access network and the operator core network functions of the 5G network. As is the case for 3GPP UE, each non-3GPP UE registers with the 5G network (via the N3IWF) as a distinct device having an individual network connection point.

SUMMARY

This summary is provided to introduce a selection of concepts in a simplified form that are further described below in the detailed description. This summary is not intended to identify key features or essential features of the claimed subject matter, nor is it intended to be used in isolation as an aid in determining the scope of the claimed subject matter.

The present disclosure is directed, in part, to systems and methods for forming and using user equipment (UE) clusters for network registration and authentication, substantially as shown and/or described in connection with at least one of the figures, and as set forth more completely in the claims. Embodiments of the present disclosure, at least in part, address the problems of providing unlicensed, non-3GPP UE with access to telecommunications networks through systems and methods that implement user equipment clustering. The embodiments presented herein introduce what is referred to herein as a UE aggregation gateway that functions to define one or more clusters of UE devices (referred to as UE clusters) from a set of UE devices that have connected to an access network. The UE aggregation gateway presents an individual UE cluster to the operator core network as a singular UE for the purposes of providing network services to those UE devices that are members of the UE cluster. In some embodiments, the UE aggregation gateway may register a UE logical entity with the 5G network (for example by following the registering and authorizing process with the N3IWF that a non-3GPP UE would follow) and associate a cluster of UE devices with that UE logical entity. The UE aggregation gateway may then function as a proxy gateway for members of the UE cluster, acting on behalf of the members of the UE cluster at least with regard to operations with functions of the operator network core. Regardless of the number of UE devices that are actually members of the UE cluster, the operator network core may interact with the single UE logical entity registered for that UE cluster by the UE aggregation gateway as if it were a single UE device.

BRIEF DESCRIPTION OF THE DRAWINGS

Aspects of the present disclosure are described in detail herein with reference to the attached Figures, which are intended to be exemplary and non-limiting, wherein.

DETAILED DESCRIPTION

Figure 1:
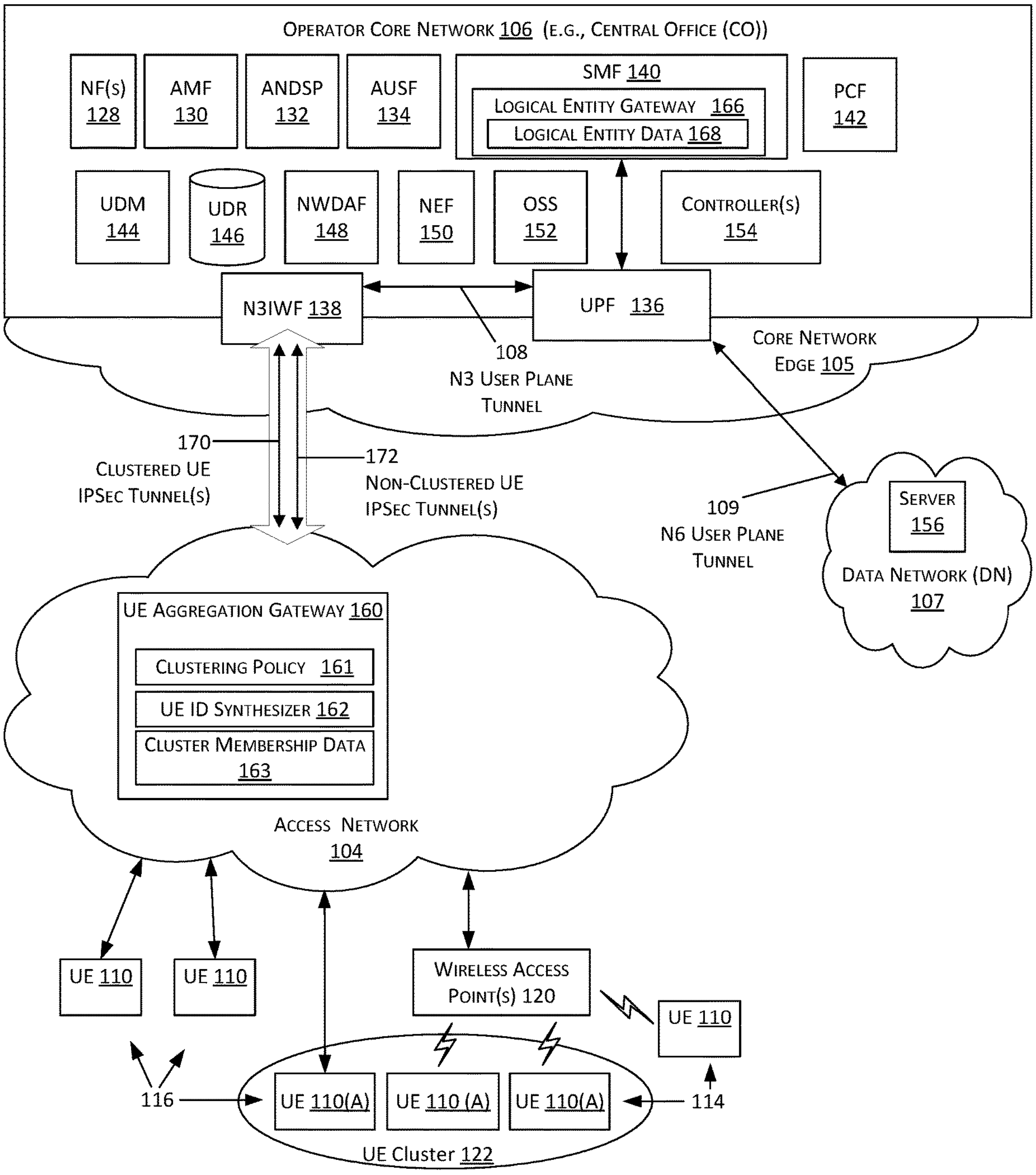
FIG. 1 is a diagram illustrating an example network environment, in accordance with some embodiments described herein.

In the following detailed description, reference is made to the accompanying drawings that form a part hereof, and in which is shown by way of specific illustrative embodiments in which the embodiments may be practiced. These embodiments are described in sufficient detail to enable those skilled in the art to practice the embodiments, and it is to be understood that other embodiments may be utilized and that logical, mechanical and electrical changes may be made without departing from the scope of the present disclosure. The following detailed description is, therefore, not to be taken in a limiting sense.

One or more of the embodiments presented in the disclosure provide for, among other things, user equipment clustering systems and methods for network registration and authentication. With the advent of 3rd Generation Partnership Project (3GPP) 5G (5th generation) networking, many new forms of user equipment (UE), such as Internet-of-Things (IOT) devices, operate at least in part as networked devices in that they send and/or receive data while performing various tasks and operations. While many of these forms of UE may generically be referred to as "smart devices", they may in fact comprise rudimentary on-device processing resources commiserate with their particular purpose, and may not include the functionality to access a 5G network as a trusted 3GPP 5G UE. For example, a device that functions as a simple binary state sensor (e.g., a window opened/shut sensor) may need relatively little computing sophistication to produce a measurement of the binary state, and to execute a basic network interface software stack to communicate the binary state when polled by another device. Other only slightly more sophisticated sensors may take environmental measurements, such as temperatures, pressures, or humidity, for example. Instead of incorporating 3GPP 5G technologies, these non-3GPP devices may comprise radio frequency (RF) circuitry for establishing non-licensed connections (e.g., via IEEE 802.11 (WiFi), and/or IEEE 802.15 (Bluetooth), or other technologies) with a wireless access point of a non-3GPP access network, and/or comprise a network interface for a wired connection to the non-3GPP access network.

Current processes today for connecting non-3GPP smart devices to a telecommunications network, such as a 5G telecommunications network, involve individually registering each non-3GPP smart device through the non-3GPP Interworking Function (N3IWF). The N3IWF essentially functions as a gateway between the non-3GPP access network and the operator core network functions of the 5G network. The N3IWF provide a secure connection point for individual UE to access the 5G network over a non-3GPP access network, with support for N2 (control plane) and N3 (user place) interfaces towards the operator core network. Once a non-3GPP UE connects to the non-3GPP access network, the UE registers and authenticates with the N3IWF. The N3IWF may then initiate protocols to register and authenticate the non-3GPP UE with one or more operator core network functions of the 5G network in order to establish data sessions (e.g., PDU sessions) and permit transport of data traffic for the non-3GPP UE through the 5G network. An operator network core today may register each non-3GPP smart device as a distinct UE, just as 3GPP UE (cell phones and cellular enabled tablet computers, for example) are registered as distinct UE on the network. However, with the number of installed smart devices expected to greatly increase, the number of individual UE registrations that need to be established and maintained by the 5G network can also be expected to substantially increase as the utilization of smart devices in homes and businesses becomes more and more prevalent. The resources of the operator network core may become increasingly strained (e.g., in terms of processing, memory, and network bandwidth) by the computing overhead consumed in establishing and maintaining connections for each of these non-3GPP UE, in addition to establishing and maintaining connections for each 3GPP UE. The operator core network may be strained potentially to the point of limiting the network's ability to provide services to the 3GPP UEs. Moreover, network operators may see such challenges as disincentives to further opening their 5G network to non-3GPP devices, which could stifle further innovations with respect to smart deceives.

Embodiments of the present disclosure, at least in part, address the problems of providing unlicensed, non-3GPP UE with access to telecommunications networks through user equipment clustering. More specifically, the embodiments presented herein introduce what is referred to herein as a UE aggregation gateway that functions to define one or more clusters of UE devices (referred to as UE clusters) from a set of UE devices that have connected to an access network. The UE aggregation gateway represents an individual UE cluster to the operator core network as a singular UE for the purposes of providing network services for those UE devices that are members of the UE cluster. That is, the UE aggregation gateway may register a UE logical entity (e.g. a non-3GPP UE logical entity) with the 5G network (for example by following the registering and authorizing process with the N3IWF that a non-3GPP UE would follow) and associate a cluster of UE devices with that UE logical entity. The UE aggregation gateway may then function as a proxy gateway for members of the UE cluster, acting on behalf of the members of the UE cluster at least with regard to operations with functions of the operator network core and/or other services accessible via the network. Regardless of the number of UE devices that are actually members of the UE cluster, the operator network core may interact with the single UE logical entity registered for that UE cluster by the UE aggregation gateway as if it were a single UE device.

The UE aggregation gateway may determine which UE devices to include in a UE cluster in various ways. Moreover, the UE aggregation gateway may define more than one UE cluster from the set of UE devices that have connected to the non-3GPP access network. In some embodiments, the UE aggregation gateway may comprise a clustering policy to determine which of the UE connected to the access network are selected to become members of a UE cluster associated with a UE logical entity. For example, in some embodiments, UE may be clustered based on function (e.g., thermostats and environmental sensor smart devices selected for membership in a first cluster, lighting control devices and motions sensors selected for membership in a second cluster). In some embodiments, UE may be clustered based on their physical location (e.g., devices on a first floor of a building selected for membership in a first cluster, devices on a second floor of a building selected for membership in a second cluster). In other embodiments, the clustering policy may be based on other classification criteria (such as clustering devices that work together as a system, for example). When a UE belonging to a UE cluster accesses a network service, the data traffic is routed through the UE aggregation gateway and transaction between the UE aggregation gateway and the 5G network performed under a UE identifier (ID) associated with the UE logical entity. In some embodiments, communications between members of a UE cluster may be routed through the UE aggregation gateway allowing members of the UE cluster to communicate with each other without generating traffic within the 5G network or otherwise consuming resources on the operator core network. In some embodiments, one or more functions of the operator core network may be programmed to differentiate a UE logical entity from other non-clustered UE registered within the network and associate data traffic for data sessions (e.g., PDU sessions) corresponding to UE members of a UE cluster with the UE logical entity for that UE cluster. Advantageously, the operator core network benefits in terms of increased efficiencies and network resource utilization by consolidating network activities of members of a UE cluster under a single UE logical entity established using a single UE registration with the operator core network.

FIG. 1 is a diagram illustrating an example network environment 100 embodiment for a wireless communication system. Network environment 100 is but one example of a suitable telecommunications network and is not intended to suggest any limitation as to the scope of use or functionality of the embodiments disclosed herein. Neither should the network environment be interpreted as having any dependency or requirement relating to any one or combination of components illustrated.

As shown in FIG. 1, network environment 100 comprises an operator core network 106 (also referred to as a "core network") that provides one or more network services to one or more UE 110 via at least one access network, such as access network 104. In some embodiments, network environment 100 comprises, at least in part, a wireless communications network. In some embodiments, the access network 104 comprises a customer premises network, such as a local area network or intra-net comprising one or more wireless access points (APs) such as, but not limited to, IEEE 802.11 (WiFi), and/or IEEE 802.15 (Bluetooth) access points.

The access network 104 may comprise a multi-modal network (for example comprising one or more multi-modal access devices) where multiple radios supporting different systems are integrated into the access network 104. Such a multi-modal access network may support a combination of 3GPP radio technologies (e.g., 4G, 5G and/or 6G) and/or non-3GPP radio technologies. In some embodiment, the access network may comprise a terrestrial network and/or may be at least in part implemented as a space-based access network (e.g., comprising a space-based and/or Earth orbiting wireless access point).

In particular, individual UE 110 may communicate with the operator core network 106 via the access network 104 over one or both of uplink (UL) radio frequency (RF) signals and downlink (DL) radio frequency (RF) signals and/or via wired network connections. The access network 104 may be coupled to the operator core network 106 via a core network edge 105 that comprises wired and/or wireless network connections that may themselves include wireless relays and/or repeaters. In some embodiments, the access network 104 may be coupled to the operator core network 106 at least in part by a backhaul network such as the Internet or other public or private network infrastructure. Core network edge 105 comprises one or more network nodes or other elements of the operator core network 106 that may define the boundary of the operator core network 106 and may serve as the architectural demarcation point where the operator core network 106 connects to other networks such as, but not limited to access network 104, the Internet, or other third-party networks.

It should be understood that in some aspects, the network environment 100 may not comprise a distinct operator core network 106, but rather may implement one or more features of the operator core network 106 within other portions of the network, or may not implement them at all, depending on various carrier preferences.

As shown in FIG. 1, network environment 100 may also comprise at least one data network (DN) 107 coupled to the operator core network 106 (e.g., via the network edge 105). In some embodiments, UE 110 may access services and/or content provided by one or more network servers 156 of DN 107. Network servers 156 may provide the UE 110 with access to services such as, but not limited to, data stores, ledgers, content streaming sources, websites, and the like. In other words, the network environment 100 may be generally configured for connecting a UE 110 to data or services that may be accessible on one or more application servers or other functions, nodes, or servers. The operating environment 100 may be generally configured, in some embodiments, for connecting UE 110 to data or services that may be accessible on one or more application servers or other functions, nodes, or servers (such as by servers 156 of data network 107).

Generally, an individual UE 110 may comprise a device capable of unidirectional or bidirectional communication with the access network 104 via wireless and/or wired communication links. The network environment 100 may be configured for wirelessly connecting UEs 110 to other UEs 110 via the same access networks 104, via other access networks, via other telecommunication networks, and/or to connect UEs to a publicly-switched telecommunication network (PSTN).

UE 110 are in general, forms of equipment and machines such as but, not limited to, Internet-of-Things (IOT) devices and smart appliances, autonomous or semi-autonomous vehicles including cars, trucks, trains, aircraft, urban air mobility (UAM) vehicles and/or drones, industrial machinery, robotic devices, exoskeletons, manufacturing tooling, thermostats, locks, smart speakers, lighting devices, smart receptacles, controllers, mechanical actuators, remote sensors, weather or other environmental sensors, wireless beacons, cash registers, turnstiles, security gates, or any other smart device. That said, in some embodiments, UE 110 may include computing devices such as, but not limited to, handheld personal computing devices, cellular phones, smart phones, tablets, laptops, and similar consumer equipment, or stationary desktop computing devices, workstations, servers and/or network infrastructure equipment. As such, the UE 110 may include both mobile UE and stationary UE. Moreover, UE 110 may comprise devices that function as both 3GPP and non-3GPP devices. A UE 110 can include one or more processors, and one or more non-transient computer-readable media for executing code to carry out the functions of the UE 110 described herein. The computer-readable media may include computer-readable instructions executable by the one or more processors. In some embodiments, the UE 110 may be implemented using a computing device 500 as discussed below with respect to FIG. 5.

In some implementations, the operator core network 106 may comprise modules, also referred to as network functions (NFs), generally represented in FIG. 1 as NF(s) 128. Such network functions may include, but are not limited to, one or more of a core access and mobility management function (AMF) 130, an access network discovery and selection policy (ANDSP) 132, an authentication server function (AUSF) 134, a user plane function (UPF) 136, non-3GPP Interworking Function (N3IWF) 138, a session management function (SMF) 140, a policy control function (PCF) 142, unified data management (UDM) 144, an unified data repository (UDR) 146, Network Data Analytics Function (NWDAF) 148, a network exposure function (NEF) 150, and an operations support system (OSS) 152. Implementation of these NFs of the operator core network 106 may be executed by one or more controllers 154 on which these network functions are orchestrated or otherwise configured to execute utilizing processors and memory of the one or more controllers 154. The NFs may be implemented as physical and/or virtual network functions, container network functions, and/or cloud-native network functions.

Notably, nomenclature used herein is used with respect to the 3GPP 5G network architecture. In other aspects, one or more of the network functions of the operator core network 106 may take different forms, including consolidated or distributed forms that perform the same general operations. For example, the AMF 130 in the 3GPP 5G architecture is configured for various functions relating to security and access management and authorization, including registration management, connection management, paging, and mobility management; in other forms, such as a 4G architecture, the AMF 130 of FIG. 1 may take the form of a mobility management entity (MME). The operator core network 106 may be generally said to authorize rights to and facilitate access to an application server/service such as provided by application function(s) requested by one or more UE, such as UE 110. In some embodiments, the at least one data network (DN) 107 may be coupled to the operator core network 106, for example via the network edge 105.

As shown in FIG. 1, UPF 136 represents at least one function of the operator core network 106 that may extend into the core network edge 105. In some embodiments, the access network 104 is coupled to the UPF 136 within the core network edge 105 by a communication link with the N3IWF that includes an N3 user plane tunnel 108. For example, the N3 user plane tunnel 108 may connect a router or network gateway of the non-3GPP access network 104 to an N3 interface of the UPF 136. Network servers 156 may be coupled to the UPF 136 in the core network edge 105 by a N6 user plane tunnel 109. For example, the N6 user plane tunnel 109 may connect a network interface (e.g., a switch, router and/or gateway) of the DN 107 to an N6 interface of the UPF 136. In some embodiments, the operator core network 106 may comprise a plurality of UPFs 236, such as a UPF at the operator core network 106 and a UPF at the core network edge 105. For example a UPF at the core network edge 105 may be used for local break out and/or low latency types of applications via an N9 interface between those UPFs.

The AMF 130 facilitates mobility management, registration management, and connection management for 3GPP devices such as (3GPP UE). ANDSP 132 facilitates mobility management, registration management, and connection management for non-3GPP devices. AUSF 134 may receive authentication requests from the AMF 130 and interacts with UDM 144, for example, for SIM authentication and/or to authenticate a UE 110 based on another device ID. N3IWF 138 provides a secure gateway for non-3GPP network access, which may be used for providing connections for UE 110 access to the operator core network 106 over the non-3GPP access network 104. SMF module 140 facilitates initial creation of protocol data unit (PDU) sessions using session establishment procedures. The PCF 142 maintains and applies policy control decisions and subscription information. Additionally, in some aspects, the PCF 142 maintains quality of service (QOS) policy rules. For example, the QoS rules stored in a unified data repository (UDR) 146 can identify a set of access permissions, resource allocations, or any other QoS policy established by an operator. In some embodiments, the PCF 142 maintains subscription information indicating one or more services and/or micro-services subscribed to by each UE 110. The UDM 144 manages network user data including, but not limited to, data storage management, subscription management, policy control, and core network 106 exposure. NWDAF 148 collects data (for example, from UE, other network functions, application functions and operations, administration, and maintenance (OAM) systems) that can be used for network data analytics. The OSS 152 is responsible for the management and orchestration of the operator core network 106, and the various physical, virtual network functions, container network functions, controllers, compute nodes, and other elements that implement the operator core network 106.

Some aspects of operating environment 100 include the UDR 146 storing information relating to access control and service and/or micro-service subscriptions. The UDR 146 may be configured to store information relating to such subscriber information and may be accessible by multiple different NFs in order to perform desirable functions. For example, the UDR 146 may be accessed by the AMF 130 in order to determine subscriber information pertaining the UE 110, accessed by a PCF 142 to obtain policy related data, accessed by NEF 150 to obtain data that is permitted for exposure to third party applications (such as applications executed by UE 110, for example). Other functions of the NEF 150 include monitoring of UE related events and posting information about those events for use by external entities, and providing an interface for provisioning UEs (via PCF 142) and reporting provisioning events to the UDR 146. Although depicted as a unified data management module, UDR 146 can be implemented as a plurality of network function (NF) specific data management modules.

The UPF 136 is generally configured to facilitate user plane operation relating to packet routing and forwarding, interconnection to a data network (e.g., DN 107), policy enforcement, and data buffering, among other operations. Using network slicing (e.g., using 5G software-defined networking (SDN) and/or 5G network slice selection function (NSSF)), the UPF 136 may establish a dedicated network slice for one or more data channels of a UE that act as, in essence, as a distinct network (for example, establishing its own QoS, provisioning, and/or security) within the same physical network architecture of the core network edge 105. For example, in different implementations, a UE may be assigned a network slick such as an Enhanced Mobile Broadband (eMBB) 5G network slice, a Massive Machine Type Communications (MMTC) 5G network slice, an Ultra-Reliable Low Latency Communication (URLLC) 5G network slice, or a Public Safety (PS) 5G network slice.

In some embodiments, the access network 104 comprises a non-3GPP access network 104 (such as a customer premise equipment (CPE) network for example). For example, the access network 104 may comprise a wide area network (WAN) or local area network (LAN) and/or may include one or more wireless access points (WAPs) 120. In such embodiments, the non-3GPP access network 104 represents an untrusted network from the perspective of the operator core network 106, and the UE 110 that access the access network 104 may represent untrusted UE 110. Accordingly, communication between the operator core network 106 and UE 110 connecting via the access network 104 may be established via the non-3GPP Interworking Function (N3IWF) 138.

In some embodiments, one or more UE 110 (such as shown at 114) may authenticate with a WAP 120 of the access network 104 to establish a wireless communications link with the access network 104. In some embodiments, one or more UE 110 (such as shown at 116) may be coupled using a network cable to establish a wired network communication link with the access network 104.

As shown in FIG. 1, the network environment 100 may further include a UE aggregation gateway 160. In some embodiments, UE aggregation gateway 160 may be implemented on a network node or other network device of the access network 104. As illustrated in FIG. 1, the UE aggregation gateway 160 may select a plurality of the UE 110 connected to the access network 104 to form at least one UE cluster 122. In some embodiments, the UE aggregation gateway 160 comprises a clustering policy 161, which may include logic and/or criteria applied by the UE aggregation gateway 160 to select members for the UE cluster 122 from the UE 110.

In the drawings, those UE 110 selected as members for a UE cluster 122 may be shown as "UE 110(A)." As illustrated in FIG. 1, a UE cluster 122 may include UE 110(A) that connect to the access network 104 using a wired connection (e.g., a network cable), UE 110(A) that connect to the access network 104 using a wireless connection (e.g., via a wireless access point 120), or a combination of UE 110(A) that connect to access network 104 using either wired or wireless connections. The selection of UE 110 by the UE aggregation gateway 160 to become members of the UE cluster 122 may be based on any criteria deemed advantageous to the users and/or operators. For example, the clustering policy 161 may instruct the UE aggregation gateway 160 to form a UE cluster 122 that includes UE 110(A) that are similar in functionality. For example, a UE cluster 122 may include UE 110(A) that comprise sensor devices, a UE cluster 122 may include UE 110(A) that comprise lighting related devices, a UE cluster 122 may include UE 110(A) that comprise refrigeration appliance (and/or other appliances), a UE cluster 122 may include UE 110(A) that comprise security devices, a UE cluster 122 may include UE 110(A) that comprise environmental control devices, a UE cluster 122 may include UE 110(A) that comprise mechanical actuators. In some implementations, the clustering policy 161 may instruct the UE aggregation gateway 160 to form a UE cluster 122 that includes UE 110(A) based on their proximity in location. For example, a UE cluster 122 may include UE 110(A) that comprise sensor devices located in a specified building, building floor, building wing, or other region of a facility, or based on which WAP 120 they use to access the access network 104.

In some embodiments, the UE aggregation gateway 160 may dynamically reconfigure the membership of a UE cluster. For example, when a new UE 110 joins the access network 104, the UE aggregation gateway 160 may apply the clustering policy 161 to determine whether the new UE 110 should be added to an existing UE cluster 122 (and if so, which one), whether a new UE cluster 122 should be formed to include the new UE 110 and one or more other UE 110, or whether the new UE 110 should remain as an non-clustered UE 110.

For each UE cluster 122, the UE aggregation gateway may register a UE logical entity with the AMF 130 and/or SMF 140 and function as a proxy gateway for UE 110(A) members of the UE cluster 122, acting on their behalf at least with regard to operations with functions of the operator network core and/or other services accessible via the network. When a UE 110 belonging to a UE cluster 122 performs an operation generating traffic with the operator network core 106 service and/or a server 156, the data traffic from that operation is routed through the UE aggregation gateway 160 and transactions between the UE aggregation gateway 160 and the 5G network performed under a UE identifier (ID) associated with the UE logical entity. The UE ID (also referred to as a device ID) used for registering the UE logical entity with the AMF 130 and/or SMF 140 may be generated by the UE aggregation gateway 160 using a UE ID synthesizer 162, as further detailed below. Regardless of the number of UE 110(A) that are actually members of the UE cluster 122, the operator network core 106 may interact with the single UE logical entity registered for that UE cluster 122 by the UE aggregation gateway 160 as if it were a single UE device. The AMF 130 and/or SMF 140 do not need to keep the individual members of the UE cluster registered as UE devices with the network—just the UE logical entity created by the UE aggregation gateway 160.

In some embodiments, the UE aggregation gateway 160 may comprise cluster membership data 163 (such as a table, for example) that indicates which of the UE 110 coupled to the access network 104 are members of a UE cluster, and may further indicate which UE cluster a UE belongs to. Network data traffic for UE 110 that are members of a UE cluster 122 per the cluster membership data 163 are routed through the UE aggregation gateway 160 and communicated through a secure tunnel with the N3IWF 138 allocated to the UE logical entity for that UE cluster 122, such as the clustered UE IPSec tunnel(s) 170 shown in FIG. 1. Network data traffic for UE 110 that are not members of a UE cluster 122 may individually register and communicate with the N3IWF 138 using one or more secure tunnels, such as the non-clustered UE IPSec tunnel(s) 172 shown in FIG. 1.

In some embodiments, the SMF 140, or other network function(s) 128 of the network core 106, may implement a logical entity gateway 166 to differentiate data traffic for PDU sessions associated with a UE logical entity from data traffic for PDU sessions for non-clustered UE. For example, the logical entity gateway 166 may comprise logical entity data 168 (such as a table, for example) that indicates which network registered UE IDs are associated with a UE logical entity that represents the UE 110(A) of a UE cluster 122. The SMF 140 may then control the UPF 136 to route the PDU sessions associated with a UE ID for a UE logical entity to the corresponding UE aggregation gateway 160 (e.g., using the N3 interface specifically associated with that UE aggregation gateway 160). The UE aggregation gateway 160 would then distribute the received PDU session data for those PDU sessions to the UE 110 of the UC cluster 122 using that session.

Figure 2:
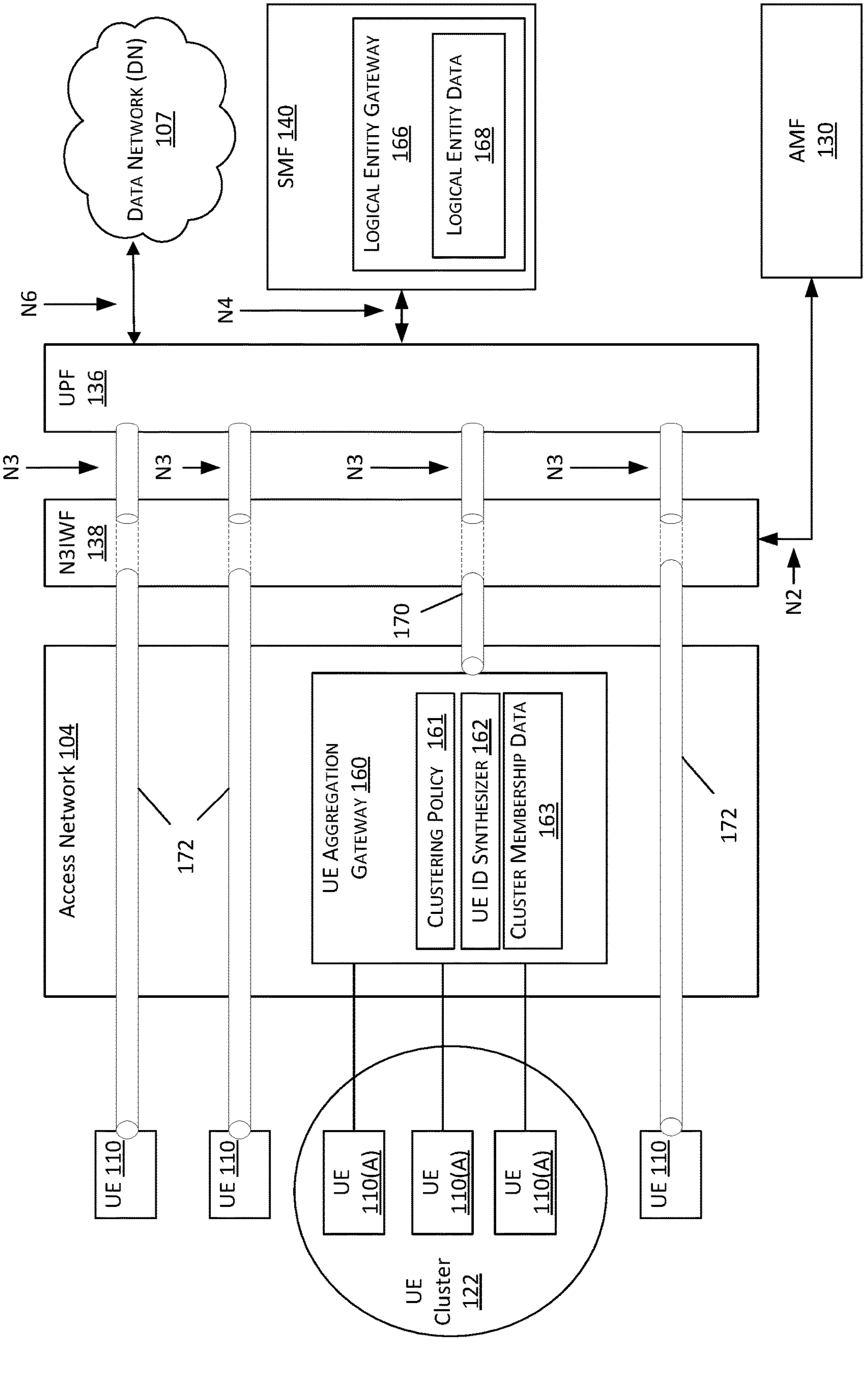
FIG. 2 is a diagram illustrating an example of user equipment clustering for a telecommunications network, in accordance with some embodiments described herein.

As previously mentioned, the UE ID used for registering the UE logical entity with the AMF 130 and/or SMF 140 may be generated by the UE aggregation gateway 160 using a UE ID synthesizer 162. In some embodiments, the UE ID synthesizer 162 may generate the UE ID for a UE logical entity by selecting a UE ID from a range of pre-provisioned UE IDs allocated to that UE aggregation gateway 160. In some embodiments, UE ID synthesizer 162 may generate a UE ID for a UE logical entity using a decentralized identifier (DID) technology, such as World Wide Web Consortium (W3C) DIDs for example. In some embodiments, a UE ID generated by the UE ID synthesizer 162 comprises a DID that resolves to a DID document. The DID document may be stored at a data registry (e.g., a verifiable data registry). For example, a DID may include a Universal Resource Identifier (URI) that associates a DID subject (which in some embodiments would be a UE logical entity corresponding to a UE cluster 122) with a DID document. The DID may include, for example, cryptographic public keys that the UE aggregation gateway 160 may use to authenticate UE logical entity with the N3IWF 138 and/or operator core network 106, and prove its association with the DID (e.g., the device ID). In some embodiments, the UE ID may be based on a self-sovereign identity (SSI) paradigm where the UE aggregation gateway 160 may present a UE ID for a UE logical entity to the operator core network 106, which may verify that the UE ID was issued from a trusted issuer. In some embodiments, a UE ID may comprise a combination of identifiers such as any of those described herein. The UE ID may comprise a combination of hardware identifiers, network address identifiers, serial numbers, component identifiers (e.g., CPU IDs), and/or other identifiers such a as discussed herein. In some embodiment a UE ID may be managed (using a Dapp, crypto wallet, or the like, for example) and verified using public-key cryptography in conjunction with a distributed ledger. For example, in some embodiment the UE ID for a UE logical entity corresponding to a UE cluster 122 may be generated by back-end block-chain based ledger and downloaded to the UE ID synthesizer 162. FIG. 2 is a is a network data flow diagram illustrating UE clustering using a UE aggregation gateway 160, in accordance with some embodiments described herein. In some embodiments, each UE 110 may initially connect to the access network 104 using the security procedures established by the access network 104 (e.g., such as a passkey). For UE 110 that meet a predetermine clustering criteria (e.g., as determined per clustering policy 161), the UE aggregation gateway 160 may assign those UE 110 (e.g., UE 110(A)) to a UE cluster 122 that is represented to the N3IWF as a UE logical entity. Although FIG. 2 illustrates an example where the UE aggregation gateway 160 forms a single UE cluster 122 from the UE 110 connecting to access network 104, it should be appreciated that in other embodiments, the UE aggregation gateway 160 may form a plurality of such UE clusters, where each UE cluster is represented to the N3IWF and registered with the operator network core 106 as a distinct UE logical entity (where each distinct UE logical entity may have its own respective UE ID generated by the UE ID synthesizer 162).

For a non-clustered UE 110, that UE 110 may register with the N3IWF 138 using standard processes, for example using an IKEv2 SA establishment procedure (and the UE 110's UE ID) to set up an IPsec Security Association (SA) based IPsec tunnel 172 between the UE 110 and the N3IWF 138. The N3IWF 138 registers the non-clustered UE 110 with the operator network core 106 (e.g., with the AMF 130 and/or SMF 140) using the UE ID of the UE 110, and PDU sessions are established whereby the user data traffic for the UE 110 may begin to flow through the UPF 136 and be transported between the UPF 136 and the UE 110 via the N3 interface, IPsec tunnel 172 and N3IWF.

For UE 110(A) selected as members of a UE cluster 122, the UE aggregation gateway 160 registers with the N3IWF 138 on behalf of those UE 110(A). For example, the UE aggregation gateway 160 may register a UE logical entity corresponding to the UE cluster 122 with the N3IWF 138. In some embodiments, the UE aggregation gateway 160 and N3IWF 138 may use, for example, an IKEv2 SA establishment procedure (and a UE ID assigned to the UE logical entity) to set up an IPsec Security Association (SA) based IPsec tunnel 170 between the UE aggregation gateway 160 and the N3IWF 138. In some embodiments, the UE ID assigned to the UE logical entity may comprise a UE ID generated or otherwise assigned by the UE ID synthesizer 162. The N3IWF 138 may register the UE logical entity with the operator network core 106 (e.g., with the AMF 130 and/or SMF 140) using the UE ID of the UE logical entity in the same manner that it would register a non-clustered UE with the operator network core 106. The N3IWF thus establishes one or more secure tunnels for to carry traffic for the UE logical entity between itself and the UE aggregation gateway 160, sets up control plane signaling, and sets up authentication between the UE logical entity and the operator core network so that the UE logical entity can send and receive traffic via the UPF 136 in the same manner that a non-clustered UE 110 can do.

From the perspective of the operator network core 106, the UE logical entity is a single distinct UE regardless of the number of clustered UE 110A that are members of its UE cluster 122. PDU sessions based on network services accessed by the clustered UE 110A may be established and corresponding user data traffic begin to flow through the UPF 136 and transported between the UPF 136 and the UE aggregation gateway 160 via the N3 interface, IPsec tunnel 170 and N3IWF 138. The UE aggregation gateway 160 may route uplink and downlink user data traffic for a PDU session for an individual clustered UE 110(A) between that clustered UE 110(A) and the IPsec tunnel 170 allocated to the UE logical entity for that UE cluster 122.

In some embodiments, when the UE aggregation gateway 160 registers a UE logical entity with the operator network core 106, and/or alters the membership of the UE cluster 122 associated with the UE logical entity (e.g., adds and/or drops UEs from membership in the UE cluster 122), the UE aggregation gateway 160 may update the logical entity data 160 for the logical entity gateway 166 of the operator core network 106. For example, the UE aggregation gateway 160 may create a new UE cluster 122 by selecting UE 110 based on the clustering policy 161, instantiate a new UE logical entity for that new UE cluster 122, and assign a UE ID to that new UE logical entity. Upon reregistration of the new UE logical entity with the with the AMF 130 and/or SMF 140, the UE aggregation gateway 160 may communicate the UE ID to the logical entity data 168 of the logical entity gateway 166. The logical entity gateway 166 may use the logical entity data 168 to determine which PDU sessions (for clustered UE 110) are associated with which UE logical entity. In some embodiments comprising multiple UE aggregation gateways, the logical entity gateway 166 may further use the logical entity data 168 to determine which UE logical entity is associated with which UE aggregation gateway. The SMF 140 may control the UPF 136 to route the PDU session traffic associated with the UE 110 of a UE logical entity to the corresponding UE aggregation gateway 160 (e.g., using the N3 interface specifically associated with that UE aggregation gateway 160).

Figure 3:
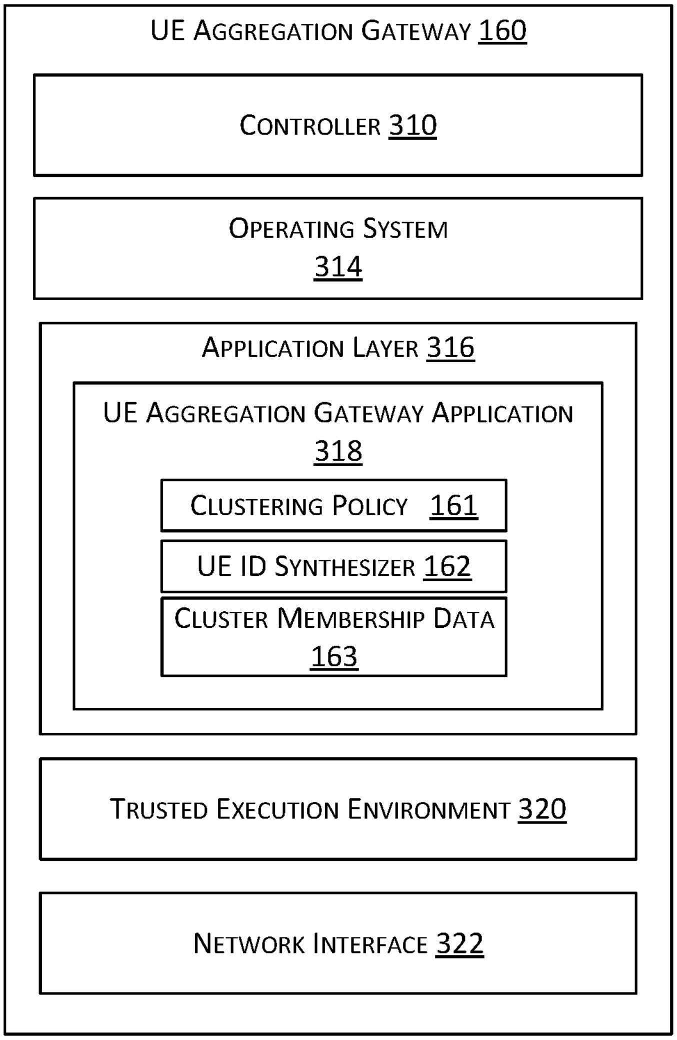
FIG. 3 is a diagram illustrating an example user equipment aggregation gateway, in accordance with some embodiments described herein.

With reference now to FIG. 3, FIG. 3 illustrates an example UE aggregation gateway, such as UE aggregation gateway 160. In some embodiments, the UE aggregation gateway 160 may be implemented on a service or other network device (e.g., a network node) of the access network 104. In some embodiments, the UE aggregation gateway 160 may be implemented on a service or other network device (e.g., a network node) of the core network edge 105. In some embodiments, the functions described herein performed by the UE aggregation gateway 160 may be distributed across network nodes of the access network 104 and/or the core network edge 105. In some embodiments, the UE aggregation gateway 160 may be at least in part integrated into servers or network nodes performing one or more functions of the access network 104 and/or core network edge 105. Moreover, in some embodiments, the functions described herein performed by the UE aggregation gateway 160 may be implemented by a UE 110 functioning as the UE aggregation gateway 160.

Although the UE aggregation gateway 160 may include different or other components, generally UE aggregation gateway 160 may include a controller 310 (which may comprise one or more processing units and a memory), an operating system 314 and an application layer 316 that includes a UE aggregation gateway application 318 which may be executed by the controller 310. The UE aggregation gateway 160 may further include at least one network interface 322 for connecting with the UE 110(A) of a UE cluster 122, for connecting to the N3IWF 138, other network components of the access network 104, components of the core network edge 105, and/or components of the operator core network 106. In some embodiments, the UE aggregation gateway 160 itself may be considered an untrusted non-3GPP element of the access network 104 and/or register itself as a network device using the N3IWF 138. In such embodiments, the registration of individual non-3GPP UE logical entities with the N3IWF 138 (and the AMF 130 and/or SMF 140) may be logically distinct from the registration of the UE aggregation gateway 160. That is, the functions of the operator core network 106 would perceive the UE aggregation gateway 160 and the non-3GPP UE logical entities it creates as logically distinct network connection. In other embodiments, the UE aggregation gateway 160 may itself, as a device, not register with the N3IWF 138 and/or the operator core network 106 and thus function as a transparent entity from the perspective of the operator core network 106. That is, the operator core network 106 would perceive the existence of the non-3GPP UE logical entities created by the UE aggregation gateway 160 (because they were registered as if they were UE device), but not perceive the existence of the UE aggregation gateway 160 as a distinct entity/network connection.

In the embodiment shown in FIG. 3, the UE aggregation gateway 160 includes operating system 314 and UE aggregation gateway application 318 that are executed by the controller 310 to implement the one or more functions of the UE aggregation gateway 160 described herein. The UE aggregation gateway 160 may include an application layer 316 and may include a trusted execution environment (TEE) 320. The application layer 320 facilitates execution of the operating system 314 and executables (including UE aggregation gateway application 318). In some embodiments TEE 320 facilitates a secure area of the processor(s) of the UE aggregation gateway 160 where isolated execution and confidentiality features are enforced. Example TEEs that may be used for The UE aggregation gateway 160 include, but are not limited to, Arm TrustZone technology, Software Guard Extensions (SGX) technology, Reduced Instruction Set Computer—Five (RISC-V), or similar technologies.

In some embodiments, application layer 316 may include applications executed in a rich environment and/or applications executed in the TEE 320. One or more aspects of the UE aggregation gateway 160 may be executed in the rich environment, and/or at least partially executed in the TEE 320. For example, one or more of the clustering policy 161, UE ID synthesizer 162, and/or clustered device table 163, may be implemented at least in part as a "trustlet" in a trusted environment protected from tampering or manipulation by a hardware Root of Trust and hosted from the TEE 320. Generally, computer readable code executed in the TEE 320 is referred to as a "trustlet". A trustlet can securely access data stored memory of the UE aggregation gateway 160 that is otherwise inaccessible in the application layer 316. A trustlet may take the form of trusted processes, secure processes, isolated user mode (IUM) processes, or the like. For example, a trustlet executed in TEE 320 may access system level data (that is, data related to the larger machine the UE aggregation gateway 160 in incorporated within), private and/or public keys, and similar data stored, or accessed, by the UE aggregation gateway 160. Trustlets can be activated in response to various network and/or UE aggregation gateway 160 operations. For example, a trustlet can be activated by execution of an associated application in the application layer 316. For another example, a trustlet can be activated in response to a command generated by a network (e.g., operator core network 106 and/or N3IWF 138 of FIG. 1) and communicated to the UE aggregation gateway 160. The trustlet(s) activated may vary depending on the service requested. Upon activation, a trustlet performs a set of predetermined operations. The operations can include, but are not limited to: assessing data stored by the UE aggregation gateway 160, (such as a set keys that are embedded directly into a processor or microcontroller during manufacturing, certificates of authority, unique device identifiers, or any other data); monitoring operations of the UE aggregation gateway 160 (such as monitoring processor load, microcontroller load, activation of other systems, or other similar operations); access or monitor operations of other applications executed by the UE aggregation gateway 160; writing data to the memory of UE aggregation gateway 160; activate another trustlet; or any combination thereof.

In some embodiments, one or more aspects of the UE aggregation gateway 160 (such as clustering policy 161, UE ID synthesizer 162, and/or clustered device table 163) may be implemented by a trustlet that comprise a distributed application (e.g., a Dapp). A Dapp may comprise a top-tier definition for an application programmable interface (API) that is coded specifically to control a block-chain or distributed ledger instance and, in some implementations, are embedded directly into the blocks themselves (to form what is referred to as a smart contract (SC)). In some embodiments, non-3GPP UE logical entities generated by the UE aggregation gateway application 318 may be instantiated by a Dapp in accordance with the clustering policy 161. A Dapp may track and update the UE membership of a UE cluster 122 membership corresponding to each UE logical entity managed by that EU aggregation gateway 160. In some embodiments, the Dapp may update the cluster membership data 163 and/or the logical entity data 168 based on changes to the membership of UE cluster 122. In some embodiments, the cluster membership data 163 and/or the logical entity data 168 are maintained as ledgers. For example, the cluster membership data 163 and/or the logical entity data 168 may be stored to one or more ledgers that comprise a distributed ledger technology (DLT), a Hyperledger technology, and/or a block-chain technology that interact with one or more Dapps of the UE aggregation gateway application 318. When a Dapp is implemented using one or more smart contracts, there can be as many stipulations as needed programmed into the smart contract to satisfy the participants (i.e., the wireless network provider) that information regarding the UE logical entity and members of it UE cluster is gathered and recorded with integrity. For example, a preprogrammed smart contract may establish terms upon which the data elements will determine how transactions and data are represented on a block-chain or ledger record. Such a smart contract utilizes "if/when . . . then . . . " rules that govern the data indicators and to explore possible exceptions that might affect the fidelity of collected data and its viability as trusted data. In some implementations, exceptions are delegated to a reference chain that contains variations of programming that differ from the priority smart contract program.

Figure 4:
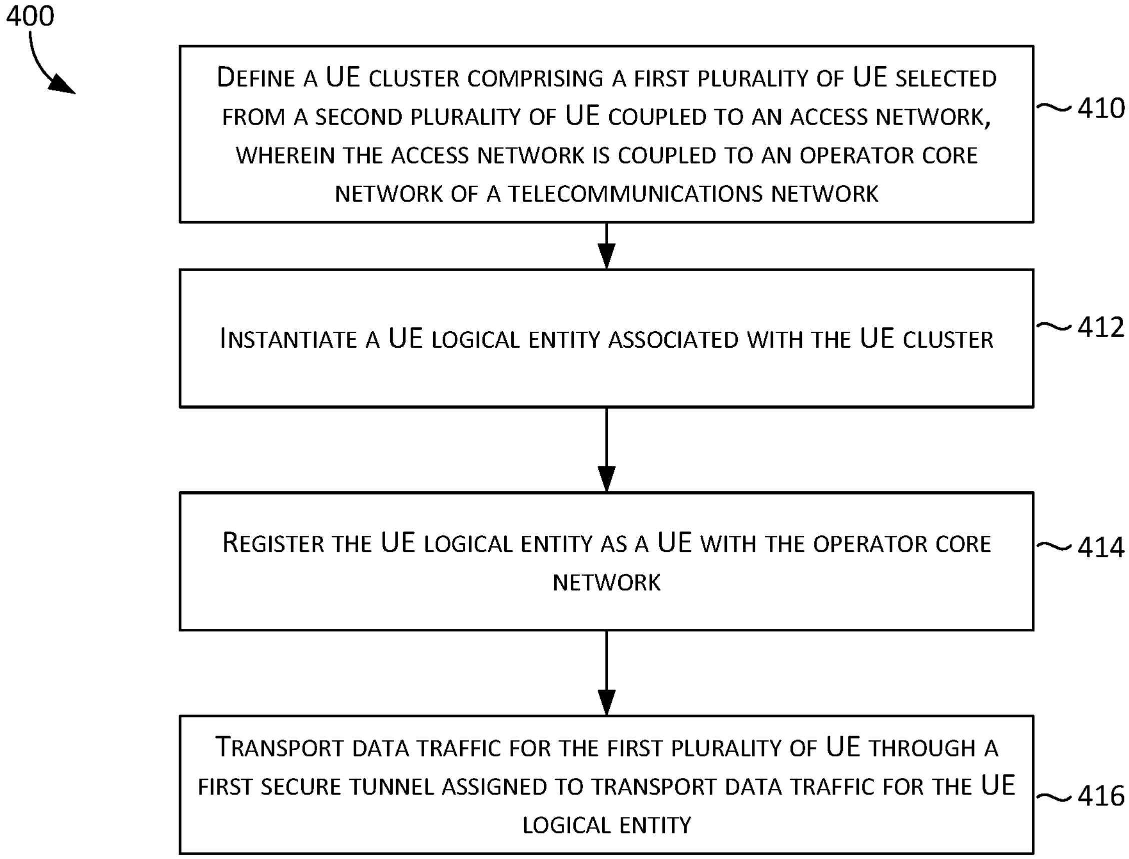
FIG. 4 is a flow chart illustrating an example method for user equipment clustering, in accordance with some embodiments described herein.

FIG. 4 is a flow chart illustrating a method 400 for cluster based user equipment (UE) network registration, according to one embodiment. It should be understood that the features and elements described herein with respect to the method of FIG. 4 may be used in conjunction with, in combination with, or substituted for elements of, any of the other embodiments discussed herein and vice versa. Further, it should be understood that the functions, structures, and other descriptions of elements for embodiments described in FIG. 4 may apply to like or similarly named or described elements across any of the figured and/or embodiments described herein and vice versa. In some embodiments, elements of method 400 are implemented utilizing one or more processing units of a UE aggregation gateway 160, as disclosed in any of the embodiments herein.

The method 400 at 410 includes defining a UE cluster comprising a first plurality of UE selected from a second plurality of UE coupled to an access network, wherein the access network is coupled to an operator core network of a telecommunications network. For example, the UE aggregation gateway 160 may select a plurality of the UE 110 connected to the access network 104 to form at least one UE cluster 122. The method may define the UE cluster based on applying a clustering policy to select the first plurality of UE from the second plurality of UE. For example, the clustering policy includes logic to select the first plurality of UE from the second plurality of UE based on one or more of: a function criteria, a classification criteria, or a location criteria, such as previously discussed. The method may communicate an association between the UE logical entity and the first plurality of UE of the UE cluster to at least one network function of the operator core network. For example, the UE aggregation gateway may communicate the membership or other information about the UE cluster and/or the UE logical entity to the logical entity gateway and/or logical entity data. In some embodiments, one or more records may be stored to a ledger indicating a membership UE belonging to the UE cluster. The ledger may comprise at least one of a distributed ledger technology (DLT), a Hyperledger technology, or a block-chain technology that communicate with a Dapp of the UE aggregation gateway.

The method 400 at 412 includes instantiating a UE logical entity associated with the UE cluster. The UE aggregation gateway may register a UE logical entity with the AMF 130 and/or SMF 140 and function as a proxy gateway for UE 110(A) members of the UE cluster 122, acting on their behalf with regard to operations with functions of the operator network core and/or other services available through the network. In some embodiments, the method includes assigning a UE identifier (ID) to the UE logical entity, wherein the UE logical entity is registered with the operator core network based on the UE ID. As previously discussed, the UE ID may be, for example, an ID of a network gateway comprising the one or more processors, an ID selected from one or more pre-provisioned UE IDs, an ID generated using a blockchain technology, or other ID.

The method 400 at 414 includes registering the UE logical entity as an individual UE with the operator core network. The method may include authenticating the UE logical entity as a UE to at least one of a core access and mobility management function (AMF) or a session management function (SMF) using the UE ID assigned to the UE logical entity.

The method 400 at 416 includes transporting data traffic for the first plurality of UE through a first secure tunnel assigned to transport data traffic for the UE logical entity. The data traffic comprises PDU session data for one or more of the first plurality of UE including session data carried across the UPF of the operator core network. When a UE 110 belonging to a UE cluster 122 performs an operation generating traffic with the operator network core 106 service and/or a server 156, the data traffic from that operation is routed through the UE aggregation gateway 160 and transactions between the UE aggregation gateway 160 and the 5G network performed under a UE identifier (ID) associated with the UE logical entity. Network data traffic for UE 110 that are members of a UE cluster 122 per the cluster membership data 163 may be routed through the UE aggregation gateway 160 and communicated through a secure tunnel with the N3IWF 138 allocated to the UE logical entity for that UE cluster 122, such as the clustered UE IPSec tunnel(s) 170 shown in FIG. 1. UE 110 that are not members of a UE cluster 122 may individually register and communicate with the N3IWF 138 using one or more secure tunnels, such as the non-clustered UE IPSec tunnel(s) 172 shown in FIG. 1, and network data traffic for such non-clustered UE 110 transported via those tunnel(s) 172.

Advantageously, the operator core network benefits from the incorporation of the UE aggregation gateway 160 in terms of increased efficiencies and network resource utilization by consolidating network activities of members of a UE cluster under a single UE logical entity established using a single UE registration with the operator core network.

Figure 5:
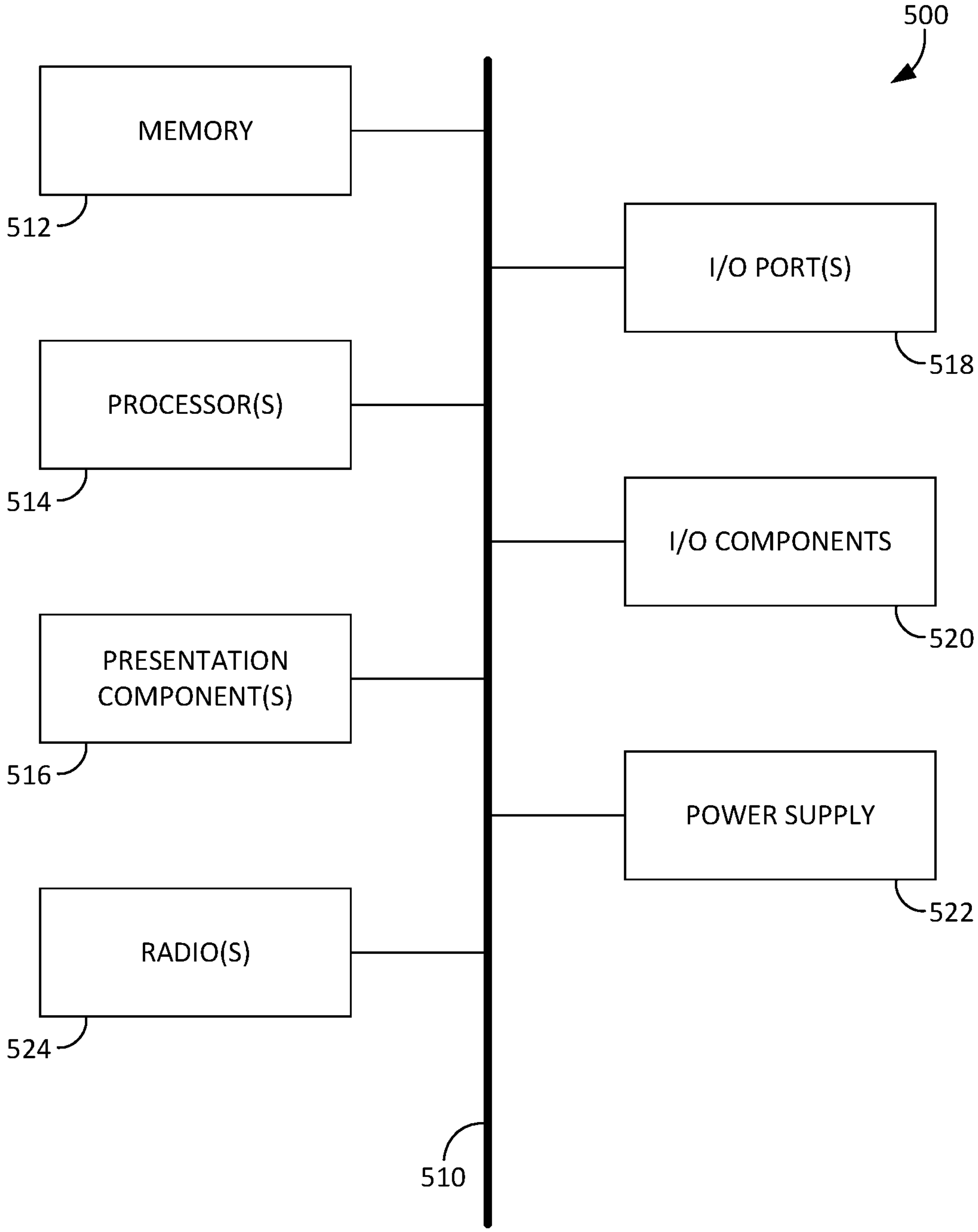
FIG. 5 is an example computing device, in accordance with some embodiments described herein.

Referring to FIG. 5, a diagram is depicted of an exemplary computing environment suitable for use in implementations of the present disclosure. In particular, the exemplary computer environment is shown and designated generally as computing device 500. Computing device 500 is but one example of a suitable computing environment and is not intended to suggest any limitation as to the scope of use or functionality of the embodiments described herein. Neither should computing device 500 be interpreted as having any dependency or requirement relating to any one or combination of components illustrated.

The implementations of the present disclosure may be described in the general context of computer code or machine-useable instructions, including computer-executable instructions such as program components, being executed by a computer or other machine, such as a personal data assistant or other handheld device. Generally, program components, including routines, programs, objects, components, data structures, and the like, refer to code that performs particular tasks or implements particular abstract data types. Implementations of the present disclosure may be practiced in a variety of system configurations, including network servers, network nodes, handheld devices, consumer electronics, general-purpose computers, specialty computing devices, etc. Implementations of the present disclosure may also be practiced in distributed computing environments where tasks are performed by remote-processing devices that are linked through a communications network.

With continued reference to FIG. 5, computing device 500 includes bus 510 that directly or indirectly couples the following devices: memory 512, one or more processors 514, one or more presentation components 516, input/output (I/O) ports 518, I/O components 520, power supply 522, and radio 524. Bus 510 represents what may be one or more busses (such as an address bus, data bus, or combination thereof). The devices of FIG. 5 are shown with lines for the sake of clarity. However, it should be understood that the functions performed by one or more components of the computing device 500 may be combined or distributed amongst the various components. For example, a presentation component such as a display device may be one of I/O components 520. In some embodiments, the UE aggregation gateway 160 may comprise a computing device 500. In some embodiments, the UE aggregation gateway 160 may be implemented on a network node of core network edge 105 that may comprise a computing device 500. The processors of computing device 500, such as one or more processors 514, have memory. The present disclosure hereof recognizes that such is the nature of the art, and reiterates that FIG. 5 is merely illustrative of an exemplary computing environment that can be used in connection with one or more implementations of the present disclosure. Distinction is not made between such categories as "workstation," "server," "laptop," "handheld device," etc., as all are contemplated within the scope of FIG. 5 and refer to "computer" or "computing device." In some embodiments, the UE aggregation gateway 160, or other components of the UE 110, access network 104, core network edge 105, operator core network 106, and/or other components as described in any of the examples of this disclosure may be implemented at least in part by code executed by the one or more processors (s) 514. The cluster membership data 163 may be stored or otherwise implemented at least in part by memory 512.

Computing device 500 typically includes a variety of computer-readable media. Computer-readable media can be any available media that can be accessed by computing device 500 and includes both volatile and nonvolatile media, removable and non-removable media. By way of example, and not limitation, computer-readable media may comprise computer storage media and communication media. Computer storage media includes both volatile and nonvolatile, removable and non-removable media implemented in any method or technology for storage of information such as computer-readable instructions, data structures, program modules or other data.

Computer storage media includes non-transient RAM, ROM, EEPROM, flash memory or other memory technology, CD-ROM, digital versatile disks (DVD) or other optical disk storage, magnetic cassettes, magnetic tape, magnetic disk storage or other magnetic storage devices. Computer storage media and computer-readable media do not comprise a propagated data signal or signals per se.

Communication media typically embodies computer-readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer-readable media.

Memory 512 includes computer-storage media in the form of volatile and/or nonvolatile memory. Memory 512 may be removable, non-removable, or a combination thereof. Exemplary memory includes solid-state memory, hard drives, optical-disc drives, etc. Computing device 500 includes one or more processors 514 that read data from various entities such as bus 510, memory 512 or I/O components 520. One or more presentation components 516 presents data indications to a person or other device. Exemplary one or more presentation components 516 include a display device, speaker, printing component, vibrating component, etc. I/O ports 518 allow computing device 500 to be logically coupled to other devices including I/O components 520, some of which may be built in computing device 500. Illustrative I/O components 520 include a microphone, joystick, game pad, satellite dish, scanner, printer, wireless device, etc.

Radio(s) 524 represents a radio that facilitates communication with a wireless telecommunications network. For example, radio(s) 524 may be used to establish communications with components of the access network 104, operator core network 106 and/or core network edge 105. Illustrative wireless telecommunications technologies include CDMA, GPRS, TDMA, GSM, and the like. In some embodiments, the radio(s) 524 comprise circuits that implement a radio module for network interface 322. Radio(s) 524 may additionally or alternatively facilitate other types of wireless communications including Wi-Fi, WiMAX, LTE, and/or other VOIP communications. In some embodiments, radio(s) 524 may support multi-modal connections that include a combination of 3GPP radio technologies (e.g., 4G, 5G and/or 6G) and/or non-3GPP radio technologies. As can be appreciated, in various embodiments, radio(s) 524 can be configured to support multiple technologies and/or multiple radios can be utilized to support multiple technologies. A wireless telecommunications network might include an array of devices, which are not shown so as to not obscure more relevant aspects of the embodiments described herein. Components such as a base station, a communications tower, or even access points (as well as other components) can provide wireless connectivity in some embodiments.

Figure 6:
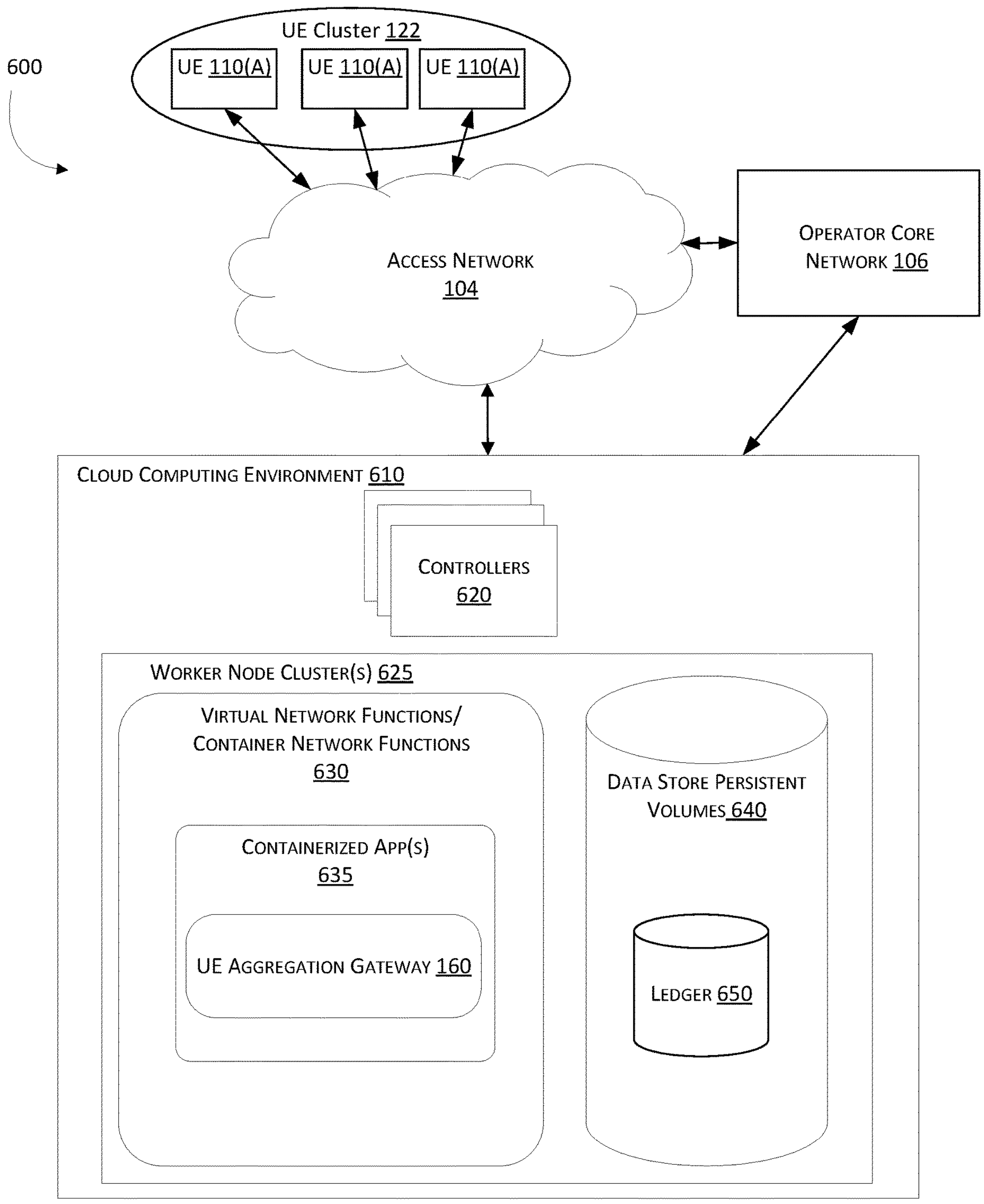
FIG. 6 is an example cloud computing platform, in accordance with some embodiments described herein.

Referring to FIG. 6, a diagram is depicted general at 600 of an exemplary cloud computing environment 610 for implementing one or more aspects of a UE aggregation gateway 160 as implemented by the systems and methods described herein. Cloud computing environment 610 is but one example of a suitable cloud-computing environment and is not intended to suggest any limitation as to the scope of use or functionality of the embodiments presented herein. Neither should cloud-computing environment 610 be interpreted as having any dependency or requirement relating to any one or combination of components illustrated. In some embodiments, the cloud-computing environment 610 is executed within access network 104, the core network edge 105, or otherwise coupled to the core network edge 105 or operator core network 106.

Cloud computing environment 610 includes one or more controllers 620 comprising one or more processors and memory. The controllers 620 may comprise servers of a data center. In some embodiments, the controllers 620 are programmed to execute code to implement at least one or more aspects of the UE aggregation gateway 160. For example, in one embodiment the UE aggregation gateway 160 may be implemented as one or more virtual network functions (VNFs) and/or container network functions (CNFs) 630 running on a worker node cluster 625 established by the controllers 620. The cluster of worker nodes 625 may include one or more orchestrated Kubernetes (K8s) pods that realize one or more containerized applications 635 for the UE aggregation gateway 160. In other embodiments, another orchestration system may be used to realize the UE aggregation gateway 160. For example the worker nodes 625 may use lightweight Kubernetes (K3s) pods, Docker Swarm instances, and/or other orchestration tools. In some embodiments, the clustered UE 110(A) of a UE cluster 122 may be coupled to the controllers 620 of the cloud-computing environment 610 by access network 104. In some embodiments, one or more ledgers 650 may be implemented at least in part as one or more data store persistent volumes 640 in the cloud-computing environment 610.

In various alternative embodiments, system and/or device elements, method steps, or example implementations described throughout this disclosure (such as the UE, access networks, core network edge, operator core network, UE aggregation gateway, logical entity gateway, and/or any of the sub-parts thereof, for example) may be implemented at least in part using one or more computer systems, field programmable gate arrays (FPGAs), application specific integrated circuits (ASICs) or similar devices comprising a processor coupled to a memory and executing code to realize that elements, processes, or examples, said code stored on a non-transient hardware data storage device. Therefore, other embodiments of the present disclosure may include elements comprising program instructions resident on computer readable media which when implemented by such computer systems, enable them to implement the embodiments described herein. As used herein, the term "computer-readable media" refers to tangible memory storage devices having non-transient physical forms. Such non-transient physical forms may include computer memory devices, such as but not limited to: punch cards, magnetic disk or tape, any optical data storage system, flash read only memory (ROM), non-volatile ROM, programmable ROM (PROM), erasable-programmable ROM (E-PROM), random access memory (RAM), or any other form of permanent, semi-permanent, or temporary memory storage system of device having a physical, tangible form. Program instructions include, but are not limited to, computer executable instructions executed by computer system processors and hardware description languages such as Verilog or Very High Speed Integrated Circuit (VHSIC) Hardware Description Language (VHDL).

As used herein, the terms “function”, “unit”, “server”, “node” and “module” are used to describe computer processing components and/or one or more computer executable services being executed on one or more computer processing components. In the context of this disclosure, such terms used in this manner would be understood by one skilled in the art to refer to specific network elements and not used as nonce word or intended to invoke 35 U.S.C. 112(f).

Many different arrangements of the various components depicted, as well as components not shown, are possible without departing from the scope of the claims below. Embodiments in this disclosure are described with the intent to be illustrative rather than restrictive. Alternative embodiments will become apparent to readers of this disclosure after and because of reading it. Alternative means of implementing the aforementioned can be completed without departing from the scope of the claims below. Certain features and sub-combinations are of utility and may be employed without reference to other features and sub-combinations and are contemplated within the scope of the claims.

In the preceding detailed description, reference is made to the accompanying drawings which form a part hereof wherein like numerals designate like parts throughout, and in which is shown, by way of illustration, embodiments that may be practiced. It is to be understood that other embodiments may be utilized and structural or logical changes may be made without departing from the scope of the present disclosure. Therefore, the preceding detailed description is not to be taken in the limiting sense, and the scope of embodiments is defined by the appended claims and their equivalents.

What is claimed is:

1. A system for cluster based user equipment (UE) network registration, the system comprising:

one or more processors; and one or more computer-readable media storing computer-usable instructions that, when executed by the one or more processors, cause the one or more processors to:

define, at a UE aggregation gateway integrated into a server of a wireless access network, a UE cluster comprising a first plurality of UE selected from a second plurality of UE coupled to the wireless access network, wherein individual UE of the UE cluster are individually coupled to the wireless access network and the UE aggregation gateway, and the wireless access network is coupled to an operator core network of a telecommunications network, wherein the server executes a UE aggregation gateway application configured to select the first plurality of UE based on a clustering policy;

instantiate a UE logical entity associated with the UE cluster, wherein the UE aggregation gateway application comprises a UE identifier (ID) synthesizer configured to generate a UE ID assigned to the UE logical entity;

register the UE logical entity as an individual UE with the operator core network based on the UE ID; and transport data traffic associated with the UE logical entity for the UE cluster between the UE aggregation gateway and the operator core network via a first secure tunnel allocated to transport the data traffic for the UE logical entity, wherein via the first secure tunnel, the UE aggregation gateway receives a protocol data unit (PDU) session from the operator core network associated with the UE logical entity, and distributes PDU session data from the PDU session to respective UE of the individual UE of the UE cluster.

2. The system of claim 1, wherein the data traffic comprises PDU session data for one or more of the first plurality of UE.

3. The system of claim 1, wherein the UE ID is based on at least one of:

an ID of a network gateway comprising the one or more processors;

an ID selected from one or more pre-provisioned UE IDs; and an ID generated using a blockchain technology.

4. The system of claim 1, the one or more processors further to authenticate the UE logical entity as a UE to at least one of a core access and mobility management function (AMF) or a session management function (SMF) using the UE ID assigned to the UE logical entity.

5. The system of claim 1, wherein the UE aggregation gateway application generates cluster membership data that indicates which of the second plurality of UE coupled to the wireless access network are members of at least one UE cluster, and indicates which UE cluster a respective UE belongs to.

6. The system of claim 5, wherein the clustering policy includes logic to select the first plurality of UE from the second plurality of UE based on one or more of:

a function criteria;

a classification criteria; and a location criteria.

7. The system of claim 1, the one or more processors further to communicate an association between the UE logical entity and the first plurality of UE of the UE cluster to at least one network function of the operator core network.

8. The system of claim 1, the one or more processors further to establish the first secure tunnel with a non-3GPP Interworking Function (N3IWF) of the operator core network.

9. The system of claim 1, the one or more processors further to store a record to a ledger indicating a membership of the first plurality of UE to the UE cluster, the ledger comprising at least one of a distributed ledger technology (DLT), a Hyperledger technology, or a block-chain technology.

10. The system of claim 1, the one or more processors further to transport data between the first plurality of UE without using the first secure tunnel.

11. A method for cluster based user equipment (UE) network registration, the method comprising:

defining, at a UE aggregation gateway integrated into a server of an access network, a UE cluster comprising a first plurality of UE selected from a second plurality of UE coupled to the access network, wherein individual UE of the UE cluster are individually coupled to the UE aggregation gateway, and the access network is coupled to an operator core network of a telecommunications network, wherein the server executes a UE aggregation gateway application configured to select the first plurality of UE based on a clustering policy;

instantiating a UE logical entity associated with the UE cluster, wherein the UE aggregation gateway application comprises a UE identifier (ID) synthesizer configured to generate a UE ID assigned to the UE logical entity;

registering the UE logical entity as an individual UE with the operator core network based on the UE ID;

establishing at least a first secure tunnel allocated to transport data traffic for the UE logical entity; and transporting data traffic associated with the UE logical entity for the UE cluster between the UE aggregation gateway and the operator core network via the at least the first secure tunnel, wherein via the first secure tunnel, the UE aggregation gateway receives from the operator core network a protocol data unit (PDU) session associated with the UE logical entity, and distributes PDU session data from the PDU session to respective UE of the individual UE of the UE cluster.

12. The method of claim 11, the method further comprising:

assigning a UE identifier (ID) to the UE logical entity, wherein the UE logical entity is registered with the operator core network based on the UE ID.

13. The method of claim 11, wherein the clustering policy includes logic to select the first plurality of UE from the second plurality of UE based on one or more of:

a function criteria;

a classification criteria; and a location criteria.

14. The method of claim 11, further comprising:

transporting data traffic for at least one UE of the second plurality of UE, not included in the first plurality of UE, through a second secure tunnel distinct from the at least the first secure tunnel.

15. A telecommunications network, the network comprising:

an operator core network, wherein a first plurality of user equipment (UE) communicates with the operator core network through an access network; and one or more processing units to:

define, at a UE aggregation gateway integrated into a server of the access network, a UE cluster comprising a second plurality of UE selected from the first plurality of UE based on a clustering policy, wherein individual UE of the UE cluster are individually coupled to the UE aggregation gateway, wherein the server executes a UE aggregation gateway application configured to select the first plurality of UE based on the clustering policy;

instantiate a UE logical entity associated with the UE cluster, wherein the UE aggregation gateway application comprises a UE identifier (ID) synthesizer configured to generate a UE ID assigned to the UE logical entity; and register the UE logical entity as an individual UE with at least one network function of the operator core network based on the UE ID; and transport data traffic associated with the UE logical entity for the UE cluster between the UE aggregation gateway and the operator core network via a first secure tunnel allocated to transport the data traffic for the UE logical entity, wherein via the first secure tunnel, the UE aggregation gateway receives from the operator core network a protocol data unit (PDU) session associated with the UE logical entity, and distributes PDU session data from the PDU session to respective UE of the individual UE of the UE cluster.

16. The network of claim 15, the one or more processing units to:

associate data traffic comprising session data for one or more of the second plurality of UE with the UE logical entity.

17. The network of claim 15, wherein the clustering policy includes logic to select the first plurality of UE from the second plurality of UE based on one or more of:

a function criteria;

a classification criteria; and a location criteria.

* * * * *